(12) United States Patent
Fuhr

(10) Patent No.: US 10,017,661 B2
(45) Date of Patent: Jul. 10, 2018

(54) SEALING AND FINISHING POROUS PANEL PRODUCTS AND METHODS OF PRODUCTION

(71) Applicant: Pressing Developments, L.L.C., Georgetown, TX (US)

(72) Inventor: Adam Curtis Fuhr, Georgetown, TX (US)

(73) Assignee: Pressing Developments, L.L.C., Georgetown, TX (US)

( * ) Notice: Subject to any disclaimer, the term of this patent is extended or adjusted under 35 U.S.C. 154(b) by 0 days.

(21) Appl. No.: 15/192,991

(22) Filed: Jun. 24, 2016

(65) Prior Publication Data

US 2017/0002228 A1 Jan. 5, 2017

Related U.S. Application Data

(60) Provisional application No. 62/187,104, filed on Jun. 30, 2015, provisional application No. 62/248,738, filed on Oct. 30, 2015.

(51) Int. Cl.
| | | |
|---|---|---|
| *C09D 163/10* | (2006.01) | |
| *B44C 1/24* | (2006.01) | |
| *B44C 1/22* | (2006.01) | |
| *B44F 9/02* | (2006.01) | |
| *B05D 7/06* | (2006.01) | |
| *B05D 3/06* | (2006.01) | |

(52) U.S. Cl.
CPC ............ *C09D 163/10* (2013.01); *B05D 3/067* (2013.01); *B05D 7/06* (2013.01); *B05D 2203/20* (2013.01); *B44C 1/22* (2013.01); *B44C 1/227* (2013.01); *B44C 1/24* (2013.01); *B44F 9/02* (2013.01)

(58) Field of Classification Search
CPC ......... C09D 163/10; B44C 1/22; B44C 1/227; B44C 1/24; B44F 9/02; B05D 2203/20; B05D 7/06; B05D 3/067; B05D 163/10; C08L 67/06
See application file for complete search history.

(56) References Cited

U.S. PATENT DOCUMENTS

| | | | |
|---|---|---|---|
| 3,016,293 A | 1/1962 | Cybriwsky et al. | |
| 2005/0245636 A1* | 11/2005 | Fechter | C08F 265/04 522/178 |

(Continued)

OTHER PUBLICATIONS

International Search Report for PCT/US2016/039438 dated Sep. 9, 2016.

(Continued)

*Primary Examiner* — Anita Karen Alanko
(74) *Attorney, Agent, or Firm* — Rodney J. Fuller; Booth Udall Fuller, PLC

(57) ABSTRACT

Methods of sealing porous panel products and finishing the sealed porous panel products are described. The methods comprise applying to a porous panel product at least one UV curable coating and curing by UV light the at least one UV curable coating to 50% to 100% cure to produce a sealed porous panel product. The methods further modifying the surface of the sealed porous panel product, for example by etching or embossing, after which the sealed porous panel product may be stained. Due to the claimed process of sealing the porous panel product, any strain may be used, such as water-based or solvent-based stains.

20 Claims, 8 Drawing Sheets

(56) References Cited

U.S. PATENT DOCUMENTS

| | | | | |
|---|---|---|---|---|
| 2006/0029825 | A1* | 2/2006 | Chen | B05D 7/08 |
| | | | | 428/537.1 |
| 2008/0027154 | A1* | 1/2008 | Ramsey | A01N 59/14 |
| | | | | 522/7 |
| 2008/0271842 | A1* | 11/2008 | Schoning | B05D 7/08 |
| | | | | 156/275.5 |
| 2010/0323209 | A1 | 12/2010 | Morgeneyer et al. | |
| 2012/0301738 | A1* | 11/2012 | Posey | C09D 15/00 |
| | | | | 428/514 |
| 2012/0308734 | A1* | 12/2012 | Deruyttere | C07C 229/12 |
| | | | | 427/487 |

OTHER PUBLICATIONS

Written Opinion of the International Searching Authority for PCT/US2016/039438 dated Sep. 9, 2016.

* cited by examiner

|  |  | 1st Coat | 2nd Coat | 3rd Coat |  |
|---|---|---|---|---|---|
| MDF or HDF Boards | Application Weight | 28-80 g/m² | n/a | n/a | One Coat Process |
|  | Curing Energy | 435-525 mj/cm² | n/a | n/a |  |
|  | Curing Amount | 75-90% | n/a | n/a |  |
|  | Application Weight | 28-100 g/m² (total for both coats) |  | n/a | Two Coat Process |
|  | Curing Energy | 290-525 mj/cm² | 435-525 mj/cm² | n/a |  |
|  | Curing Amount | 50-90% | 75-90% | n/a |  |
|  | Application Weight | 28-120 g/m² (total for all three coats) |  |  | Three Coat Process |
|  | Curing Energy | 290-525 mj/cm² | 350-525 mj/cm² | 495-583 mj/cm² |  |
|  | Curing Amount | 50-90% | 60-90% | 85-100% |  |
| Particle Board | Application Weight | 45-90 g/m² | n/a | n/a | One Coat Process |
|  | Curing Energy | 435-525 mj/cm² | n/a | n/a |  |
|  | Curing Amount | 75-90% | n/a | n/a |  |
|  | Application Weight | 45-120 g/m² (total for both coats) |  | n/a | Two Coat Process |
|  | Curing Energy | 290-525 mj/cm² | 435-525 mj/cm² | n/a |  |
|  | Curing Amount | 50-90% | 75-90% | n/a |  |
|  | Application Weight | 45-150 g/m² (total for all three coats) |  |  | Three Coat Process |
|  | Curing Energy | 290-525 mj/cm² | 350-525 mj/cm² | 495-583 mj/cm² |  |
|  | Curing Amount | 50-90% | 60-90% | 85-100% |  |

FIG. 9

| | | 1st Coat | 2nd Coat | 3rd Coat | |
|---|---|---|---|---|---|
| MDF or HDF Boards | Application Weight | 28-80 g/m² | n/a | n/a | One Coat Process |
| | Curing Energy | 495-525 mj/cm² | n/a | n/a | |
| | Curing Amount | 85-90% | n/a | n/a | |
| | Application Weight | 28-100 g/m² (total for both coats) | | n/a | Two Coat Process |
| | Curing Energy | 290-495 mj/cm² | 495-525 mj/cm² | n/a | |
| | Curing Amount | 50-85% | 85-90% | n/a | |
| | Application Weight | 28-120 g/m² (total for all three coats) | | | Three Coat Process |
| | Curing Energy | 290-435 mj/cm² | 350-435 mj/cm² | 495-583 mj/cm² | |
| | Curing Amount | 50-75% | 60-75% | 85-100% | |
| Particle Board | Application Weight | 45-90 g/m² | n/a | n/a | One Coat Process |
| | Curing Energy | 435-495 mj/cm² | n/a | n/a | |
| | Curing Amount | 75-85% | n/a | n/a | |
| | Application Weight | 45-120 g/m² (total for both coats) | | n/a | Two Coat Process |
| | Curing Energy | 290-525 mj/cm² | 435-495 mj/cm² | n/a | |
| | Curing Amount | 50-90% | 75-85% | n/a | |
| | Application Weight | 45-150 g/m² (total for all three coats) | | | Three Coat Process |
| | Curing Energy | 290-525 mj/cm² | 350-435 mj/cm² | 495-583 mj/cm² | |
| | Curing Amount | 50-90% | 60-75% | 85-100% | |

FIG. 10

|  |  | 1st Coat | 2nd Coat | 3rd Coat |  |
|---|---|---|---|---|---|
| MDF or HDF Boards | Application Weight | 28-80 g/m² | n/a | n/a | One Coat Process |
| | Curing Energy | 435-583 mj/cm² | n/a | n/a | |
| | Curing Amount | 75-100% | n/a | n/a | |
| | Application Weight | 28-100 g/m² (total for both coats) | | n/a | Two Coat Process |
| | Curing Energy | 290-525 mj/cm² | 435-583 mj/cm² | n/a | |
| | Curing Amount | 50-90% | 75-100% | n/a | |
| | Application Weight | 28-120 g/m² (total for all three coats) | | | Three Coat Process |
| | Curing Energy | 290-525 mj/cm² | 290-525 mj/cm² | 495-583 mj/cm² | |
| | Curing Amount | 50-90% | 50-90% | 85-100% | |
| Particle Board | Application Weight | 45-90 g/m² | n/a | n/a | One Coat Process |
| | Curing Energy | 435-583 mj/cm² | n/a | n/a | |
| | Curing Amount | 75-100% | n/a | n/a | |
| | Application Weight | 45-120 g/m² (total for both coats) | | n/a | Two Coat Process |
| | Curing Energy | 290-525 mj/cm² | 435-583 mj/cm² | n/a | |
| | Curing Amount | 50-90% | 75-100% | n/a | |
| | Application Weight | 45-150 g/m² (total for all three coats) | | | Three Coat Process |
| | Curing Energy | 290-583 mj/cm² | 350-525 mj/cm² | 495-583 mj/cm² | |
| | Curing Amount | 50-100% | 60-90% | 85-100% | |

FIG. 11

SEALING AND FINISHING POROUS PANEL PRODUCTS AND METHODS OF PRODUCTION

RELATED APPLICATIONS

This application claims the benefit U.S. Provisional Application No. 62/187,104 filed on Jun. 30, 2015; this application also claims the benefit U.S. Provisional Application No. 62/248,738 filed on Oct. 30, 2015; the contents of each of the above applications which are incorporated herein by reference thereto in their entireties.

TECHNICAL FIELD

This disclosure relates to methods of sealing porous panel products in preparation for painting and finishing and methods of finishing porous panel products.

BACKGROUND

Painted wood products are in high demand in the market. Traditional cabinet and furniture manufacturers include "painted" products in their offering. The cabinet industry, for example, offers about 40% of the entire offering in painted finishes. These painted finishes take multiple steps to accomplish the final product and are typically produced on hardwood veneer panels for every end panel and some interior panels as well. Hardwood veneers, however are costly and also not sustainable.

On the other hand, the cost of porous panel products is drastically lower than hardwood veneers. These products are also much more sustainable as they are by-products of the woodworking industry globally. Porous panel products include medium density fiberboard (MDF), high density fiberboard (HDF), medium density overlay (MDO), and high density overlay (HDO). These boards are being used to replace much more expensive hardwood veneer panels and can provide a much higher finishing capability than the hardwood veneer panels. The porous nature of these panels, however, require proper sealing to provide resistance to warping, expansion, shrinkage, or water damage.

Accordingly, there is need for methods of sealing porous panel products to achieve the same or better results in the final painting process than sealing hardwood veneer panels while not increasing the existing finishing steps involved. These methods would also greatly reduce the end user's structural cost. There is also a need to provide a method of providing a professional high quality look similar to hardwood veneer panels or better.

SUMMARY

Provided are methods of sealing and finishing porous panel products. The sealing steps of the methods comprise: applying to a porous panel product at least one UV curable coating; and curing by UV light the at least one UV curable coating to 50% to 100% cure to produce a sealed porous panel product. In some embodiment, a water-based tie coat may be applied to the porous panel product prior to the application of the at least one UV curable coating to enhance the adherence of the UV curable coating to the porous panel product. Similarly, in some embodiments, the porous panel product may be sanded prior to the application of the at least one UV curable coating. In some implementations, at least three UV curable coatings are applied to the porous panel product. The first coating may be cured 50% to 100%, the second coating may be cured 50%-75%, and the third coating may be cured 60% to 100% prior to initiating the finishing steps. The at least one UV curable coating may be applied with a weight of one or more of the following application weights: 45-150 $g/m^2$, 45-120 $g/m^2$, 45-90 $g/m^2$, 28-120 $g/m^2$, 28-100 $g/m^2$, or 28-80 $g/m^2$.

The method may also comprise applying to the porous panel product the first UV curable coating; curing by UV light the first UV curable coating with 290-525 $mj/cm^2$ of curing energy to produce a single-coated porous panel product; applying to the single-coated porous panel product the second UV curable coating; curing by UV light the second UV curable coating with 290-525 $mj/cm^2$ of curing energy to produce a double-coated porous panel product; applying to the double-coated porous panel product the third UV curable coating; and curing by UV light the third UV curable coating with 495-583 $mj/cm^2$ of curing energy to produce the sealed porous panel product.

The method may also comprise applying to the porous panel product the first UV curable coating; curing by UV light the first UV curable coating to 50% to 100% cure to produce a single-coated porous panel product; applying to the single-coated porous panel product the second UV curable coating; curing by UV light the second UV curable coating to 50% to 90% cure to produce a double-coated porous panel product; applying to the double-coated porous panel product the third UV curable coating; and curing by UV light the third UV curable coating to 85% to 100% cure to produce the sealed porous panel product.

The method may also comprise applying to the porous panel product the first UV curable coating; curing by UV light the first UV curable coating with 290-525 $mj/cm^2$ of curing energy to produce a single-coated porous panel product; applying to the single-coated porous panel product the second UV curable coating; and curing by UV light the second UV curable coating with 435-583 $mj/cm^2$ of curing energy to produce the sealed porous panel product. The method may additionally comprise applying to the porous panel product the first UV curable coating; curing by UV light the first UV curable coating to 50% to 90% cure to produce a single-coated porous panel product; applying to the single-coated porous panel product the second UV curable coating; and curing by UV light the second UV curable coating to 75% to 100% cure to produce the sealed porous panel product.

The method may comprise applying to the porous panel product the first UV curable coating; and curing by UV light the first UV curable coating with 435-583 $mj/cm^2$ of curing energy to produce the sealed porous panel product. The method may comprise applying to the porous panel product the first UV curable coating; and curing by UV light the first UV curable coating to 75% to 100% cure to produce the sealed porous panel product.

The finishing steps of the methods comprise modifying the surface of the sealed porous panel product; and applying to the sealed porous panel product a finishing coating. The surface of the porous panel product may be modified by etching or by embossing. In some implementations, the surface may be etched by sanding, for example with sandpaper or sanding belt having at the coarsest 24 grit or at the finest 80 grit. Preferably, the sealed porous panel product is etched 24 grit to 80 grit, 24 grit to 60 grit, 60 grit to 80 grit, 60 grit, or 80 grit sandpaper or sanding belt. The sealed porous panel product may also be etched by a laser. In some aspects, if the surface of the porous panel product is modified by an embosser, the surface of the sealed porous panel product may further be modified by sanding. In other aspects, the surface of the sealed porous panel product may be modified by sanding prior to being modified by an embosser. The surface of the porous panel product may be sanded with 220 grit, 320 grit, or 400 grit sandpaper or sand disk.

The application of the finishing coating comprises the application of a stain. Due to the sealing steps of the disclosed embodiments, any stain—water-based or solvent-based—may be applied to sealed porous panel product. The application of the finishing coating may further comprise the application of a coating to seal the stain, for example a varnish or surface film. In preferred embodiments, the coating to seal the stain is a clear coating. In some implementations, the surface of the sealed porous panel product is modified prior to the application of the finishing coating. However, in other implementations, for example when the modification is embossing, the surface of the sealed porous panel product may modified after the application of the stain or the coating to seal the stain.

The UV curable coatings comprise at least 97%, at least 99, or 100% solids. In some implementations, the UV curable coatings comprise at least 50% resin content. The UV curable coatings may also comprise no more than 50% of additives, for example, at least one monomer additive and/or at least one filler. The monomer additive may be selected from the group consisting of: DPGDA, HDODA, TRPDGA, TMPTA, TMPTMA, TPGDA, HDDA, and PETA. The filler may be selected from the group consisting: of $CaCO_3$, silica, talc, and silicone. In a preferred embodiment, the UV curable coatings comprise, by volume:

30%-50% acrylated epoxy;
10%-20% Nepheline syneite;
10%-20% Unsaturated polyester resin;
10%-20% Trpdga;
1%-10% 1,6-hexanediol diacrylate;
1%-10% Magnesium silicate hydrate;
1%-10% Acrylated amine;
1%-10% 1-hydroxycyclohecyl phenyl ketone;
1%-10% Amorphous fumed silica;
1%-10% Dipropyleneglycol diacrylate;
1%-10% Benzophenone;
<0.1% Ethylbenzene;
<0.1% Toluene;
<0.1% Naphthalene; and
<0.1% Benzene.

The foregoing and other aspects, features, applications, and advantages will be apparent to those of ordinary skill in the art from the specification, drawings, and the claims. Unless specifically noted, it is intended that the words and phrases in the specification and the claims be given their plain, ordinary, and accustomed meaning to those of ordinary skill in the applicable arts. The inventor is fully aware that he can be his own lexicographer if desired. The inventor expressly elects, as his own lexicographer, to use only the plain and ordinary meaning of terms in the specification and claims unless they clearly state otherwise and then further, expressly set forth the "special" definition of that term and explain how it differs from the plain and ordinary meaning. Absent such clear statements of intent to apply a "special" definition, it is the inventor's intent and desire that the simple, plain and ordinary meaning to the terms be applied to the interpretation of the specification and claims.

The inventor is also aware of the normal precepts of English grammar. Thus, if a noun, term, or phrase is intended to be further characterized, specified, or narrowed in some way, then such noun, term, or phrase will expressly include additional adjectives, descriptive terms, or other modifiers in accordance with the normal precepts of English grammar. Absent the use of such adjectives, descriptive terms, or modifiers, it is the intent that such nouns, terms, or phrases be given their plain, and ordinary English meaning to those skilled in the applicable arts as set forth above.

The foregoing and other aspects, features, and advantages will be apparent to those of ordinary skill in the art from the specification, drawings, and the claims.

BRIEF DESCRIPTION OF THE DRAWINGS

Implementations will hereinafter be described in conjunction with the appended drawings, where like designations denote like elements.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of implementations.

FIGS. 9-11 depict various embodiments of settings and targets for a process of sealing, and optionally finishing, porous panel products.

DETAILED DESCRIPTION

Figure 1:
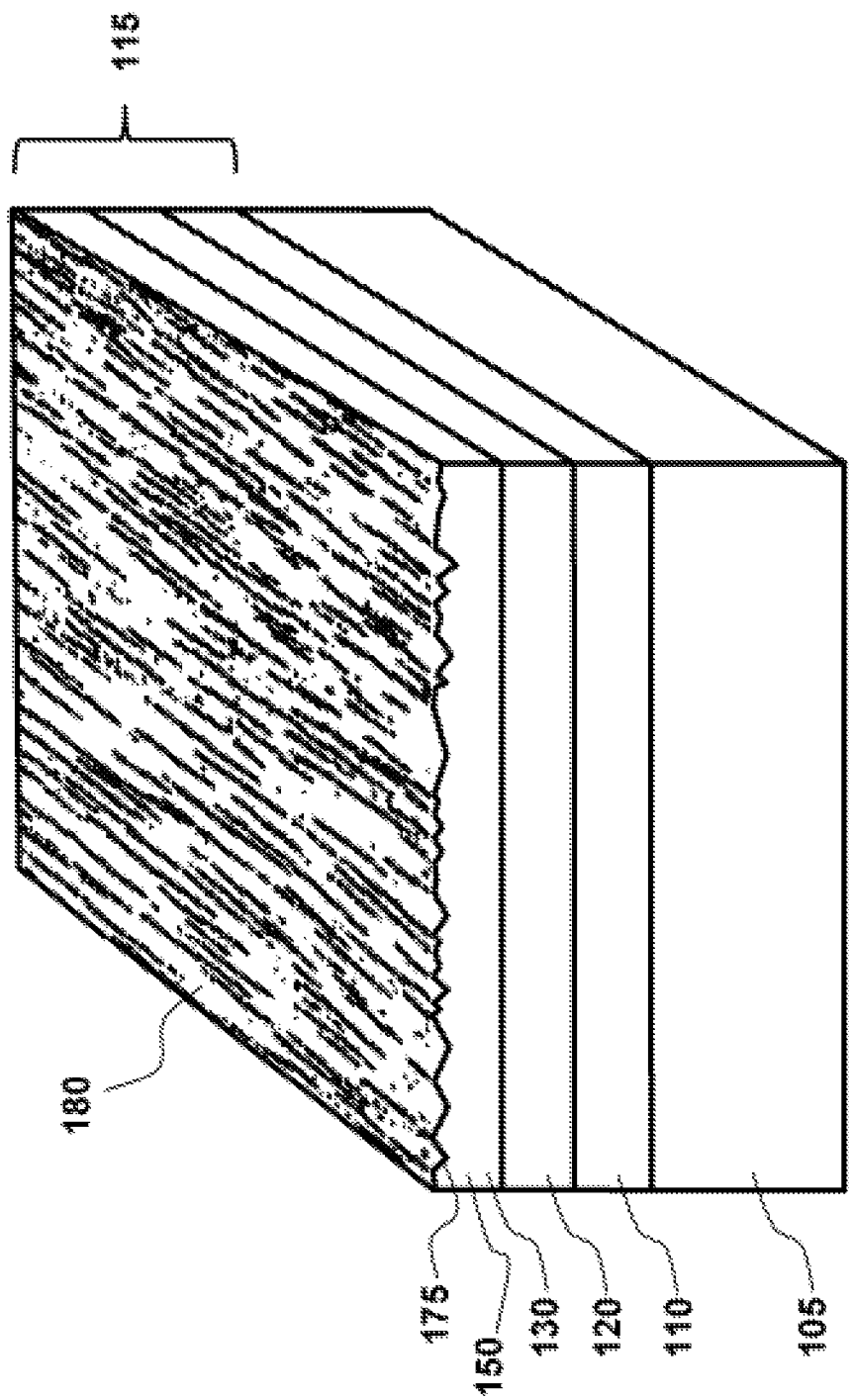
FIG. 1 depicts an example perspective view of a sealed and finished porous panel product.
Figure 2:
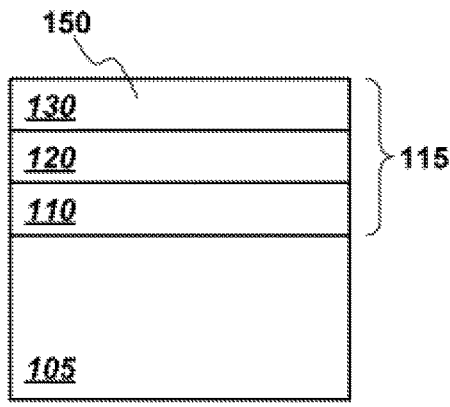
FIGS. 2-4 depict cross-sectional views of sealed porous panel products.
Figure 3:
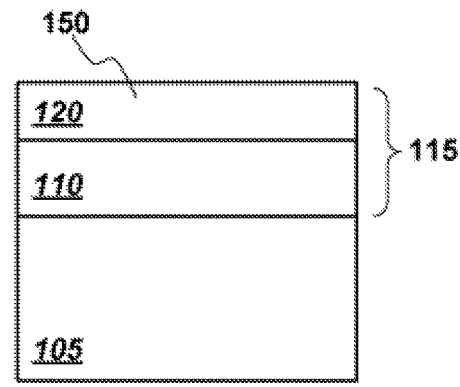
Figure 4:
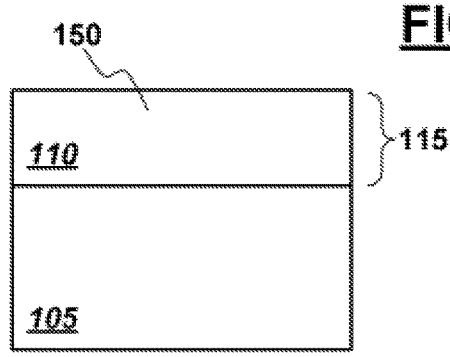
Figure 5:
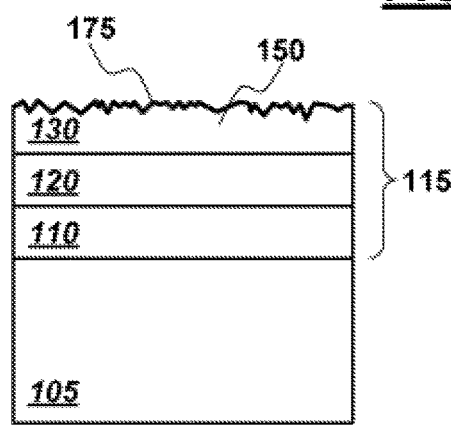
FIGS. 5 and 6 depict cross-sectional views of sealed and finished porous panel products.
Figure 6:
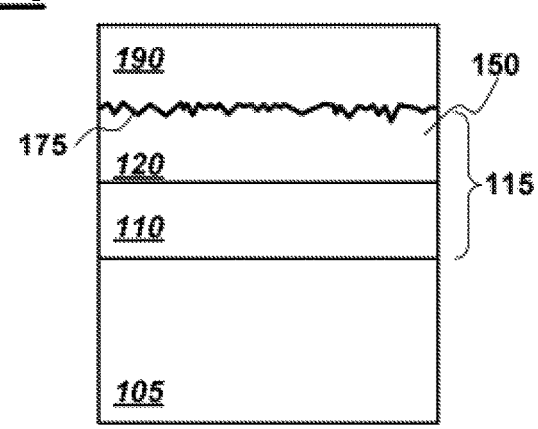

The verb "comprise" as is used in this description and in the claims and its conjugations are used in its non-limiting sense to mean that items following the word are included, but items not specifically mentioned are not excluded. In addition, reference to an element by the indefinite article "a" or "an" does not exclude the possibility that more than one of the elements are present, unless the context clearly requires that there is one and only one of the elements. The indefinite article "a" or "an" thus usually means "at least one."

As used herein, "porous panel product" refers to engineered wood products, which are composite materials manufactured by binding or fixing the strands, particles, fibers, or boards of woods together with some method of fixation. Specific examples of porous panel products include medium density fiberboard (MDF), a high density fiberboard (HDF), a medium density overlay (MDO), or a high density overlay (HDO), oriented strand board (OSB), particle board, chip board, panel products, and plywood. In preferred embodiments, a porous panel product refers to a particle board, chip board, oriented strand board (OSB), medium density fiberboard (MDF), a high density fiberboard (HDF), a medium density overlay (MDO), or a high density overlay (HDO).

As used herein, the term "resin" refers to generally to synthetic materials that are viscous liquids capable of hardening permanently. Examples of resins include polymers, oligomers, acrylics, acrylates, epoxies, urethanes, and polycarbonate.

As used herein, the term "additive" refers to generally to compounds that make the product flow, level, and/or defoam, for example a deaerator. Accordingly, additives include surface modifiers, curing agents, and the like.

As used herein, the term "finishing coating" refers to coating layer(s) visible upon completion and final assembly of a product made from porous panel product, such as cabinetry, furniture, millwork, and fixtures. Generally, the finishing coating is applied to the surface of a sealed/primed substrate.

The presently disclosed embodiments relate to the discovery that sealing porous panel products with curable coatings allows a variety of paints and finishes to adhere to the sealed porous panel product to allow the application of a variety of paints and finishes for finishing the porous panel product.

Referring to FIGS. 1-6, the methods for sealing porous panel products comprise applying to a porous panel product 105 at least one UV curable coating; and curing by ultraviolet ("UV") light the at least one UV curable coating 115 to 50% to 100% cure to produce a sealed porous panel product 105. In some implementations, the porous panel product 105 is selected from the group consisting of a MDF, a HDF, a MDO, and a HDO. In some implementations, the UV curable coating 115 is cured to 50% to 75% cure, 50% to 100% cure, and/or 60% to 100% cure. Sealing the porous panel product 105 according to the methods of the disclosed embodiments improves the brushability, chemical resistance, color uniformity, coverage, durability, flow, leveling, opacity, sheen uniformity, smoothness, and water resistance of the finishing coating. Compared to the prior art of priming porous panel products, sealing the porous panel product 105 according to the methods of the disclosed embodiments results in improved coverage compared to prior methods, enhanced durability of sealing coating, better flow of sealing coating, and increased coverage. Thus the sealing methods of the disclosure greatly reduce blemishes on the surface of porous panel products 105. Furthermore, the surface of porous panel products 105 may be modified, for example by etching or embossing (e.g., sanded surface 175), to give the appearance of wood (e.g., pattern 180), hardwood veneers, non-wood patterns, or the like.

Each of the at least one UV curable coatings 115 comprises, by volume, at least 97%, at least 98%, at least 99%, or 100% solids UV curable coating and at least 50% resin content. The UV curable coating 115 may also comprise additives, which includes monomer additives and fillers. However, the percentage of additives in the UV curable coating 115 does not exceed 50% by volume. In preferred embodiments, the monomer additives or the filler additives in the UV curable coating 115 each do not exceed 25% by volume. Examples of monomer additives in the UV curable coating 115 include dipropyleneglycol diacrylate (DPGDA), 6-hexanediol diacrylate (HDODA), tripropylene glycol diacrylat (TRPDGA), trimethylolpropane triacrylate (TMPTA), trimethylolpropane trimethacrylate (TMPTMA), tripropylene glycol diacrylate (TPGDA), hexanediol diacrylate (HDDA) or pentaerythritol triacrylate (PETA). Examples of fillers in the UV curable coating 115 include $CaCO_3$, silica, talc, and silicone. A high amount of $CaCO_3$ or silicone (polymerized siloxanes) is not desirable in the UV curable coating 115. Preferably, the UV curable coating 115 comprises, by volume, less than 15%, less than 10%, less than 5%, preferably less than 1% $CaCO_3$. If the filler comprises silicone, the silicone content is less than 1.5% by volume of the UV curable coating 115, though it is preferred that the UV curable coating comprises no silicone. An exemplary UV curable coating 115 is the HC UV Filler from RPM Wood Finishes Group, Inc. (Hickory, N.C.). The composition of the HC UV Filler is depicted in Table 1.

TABLE 1

Composition and information on ingredients of HC UV Filler from RPM Wood Finishes Group, Inc.

| Chemical Name | % Composition (by volume) |
| --- | --- |
| Acrylated epoxy | 30-50 |
| Nepheline syneite | 10-20 |
| Unsaturated polyester resin | 10-20 |
| Trpdga | 10-20 |
| 1,6-hexanediol diacrylate | 1-10 |
| Magnesium silicate hydrate | 1-10 |
| Acrylated amine | 1-10 |
| 1-hydroxycyclohecyl phenyl ketone | 1-10 |
| Amorphous fumed silica | 1-10 |
| Dipropyleneglycol diacrylate | 1-10 |
| Benzophenone | 1-10 |
| Ethylbenzene | <0.1 |
| Toluene | <0.1 |
| Naphthalene | <0.1 |
| Benzene | <0.1 |

Referring to FIGS. 7-11, in some embodiments, the methods comprise applying the porous panel product 105 with multiple UV curable coatings 115 to produce a sealed porous panel product. For example, a method for pre-sealing porous panel products 105 comprise applying to a porous panel product a first UV curable coating 110; curing by UV light the first UV curable coating 110 to 50% to 90% cure; applying to a porous panel product a second UV curable coating 120; curing by UV light the second UV curable coating 120 to 60% to 90% cure; applying to a porous panel product a third UV curable coating 130; and curing by UV light the third UV curable coating 130 to 85% to 100% cure to produce a sealed porous panel product. The first, second, and third UV curable coatings (110, 120, and 130) may comprise the same or different UV curable coatings 115, such as a single coat (see FIG. 4) or two coats (see FIG. 3). Numerous additional embodiments in FIGS. 9-11 depict and describe additional curing ranges for the first UV curable coating 110 and the optional second UV curable coating 120 and third UV curable coating 130 (also optional).

Also provided are methods for finishing a porous panel product 105. The methods comprise applying to a porous panel product 105 at least one UV curable coating 115; curing by UV light the at least one UV curable coating 110 to 50% to 100% cure to produce a sealed porous panel product 105; and applying to the sealed porous panel product a finishing coating 190. The finishing coating 190 may be paint or some other finish product. In some implementations, the methods for finishing a porous panel product 105 comprise applying to a porous panel product 105 a first UV curable coating 110; curing by UV light the first UV curable coating 110 to 50% to 90% cure; applying to a porous panel product a second UV curable coating 120; curing by UV light the second UV curable coating 120 to 60% to 90% cure; applying to a porous panel product a third UV curable coating 130; curing by UV light the third UV curable coating 130 to 85% to 100% cure to produce a sealed porous panel product; and applying to the sealed porous panel product a finishing coating.

Figure 7A:
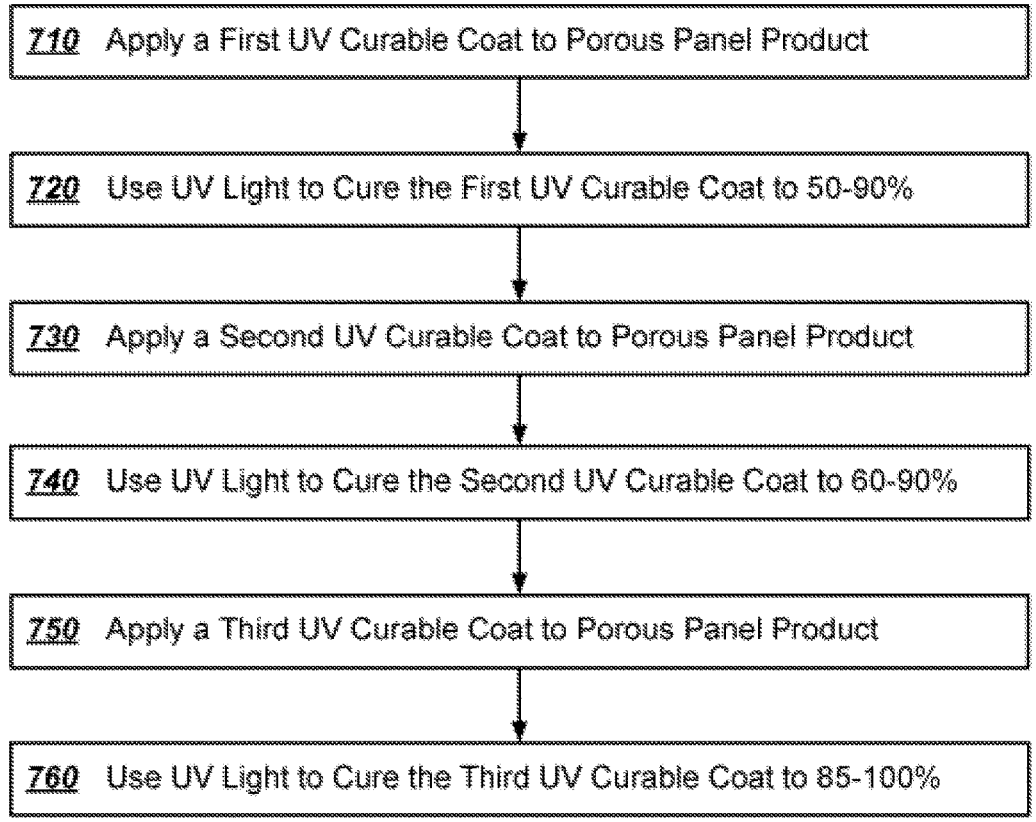
FIGS. 7A-7C depict examples of various embodiments of sealing porous panel products.
Figure 7B:
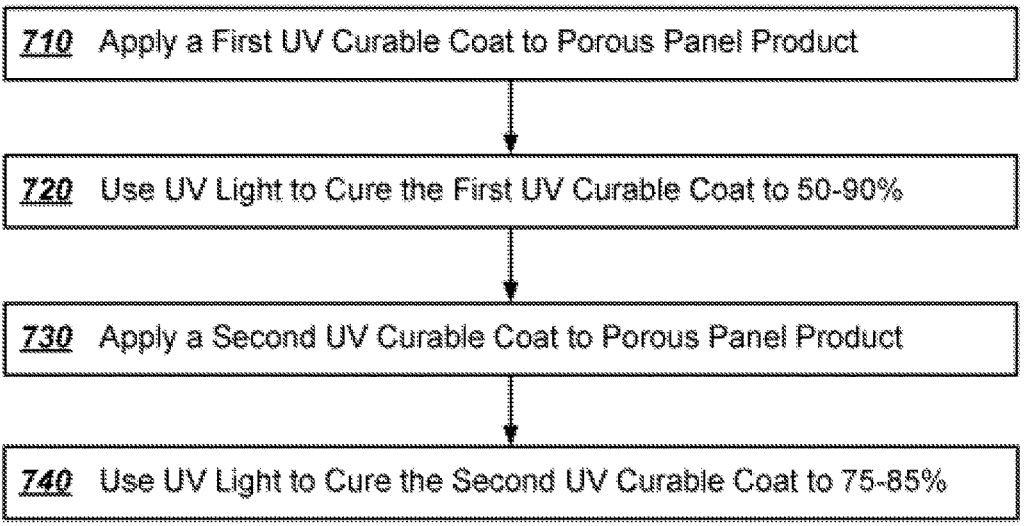
Figure 7C:
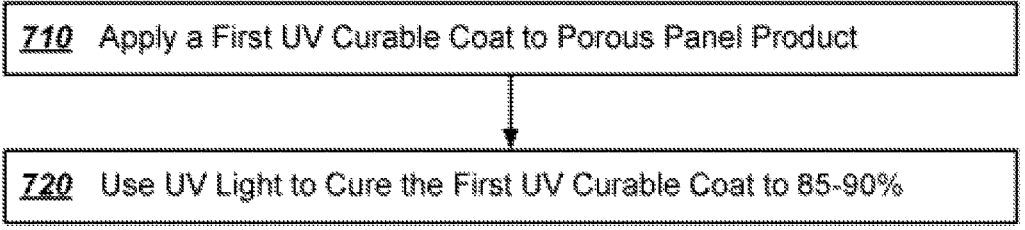
Figure 8:
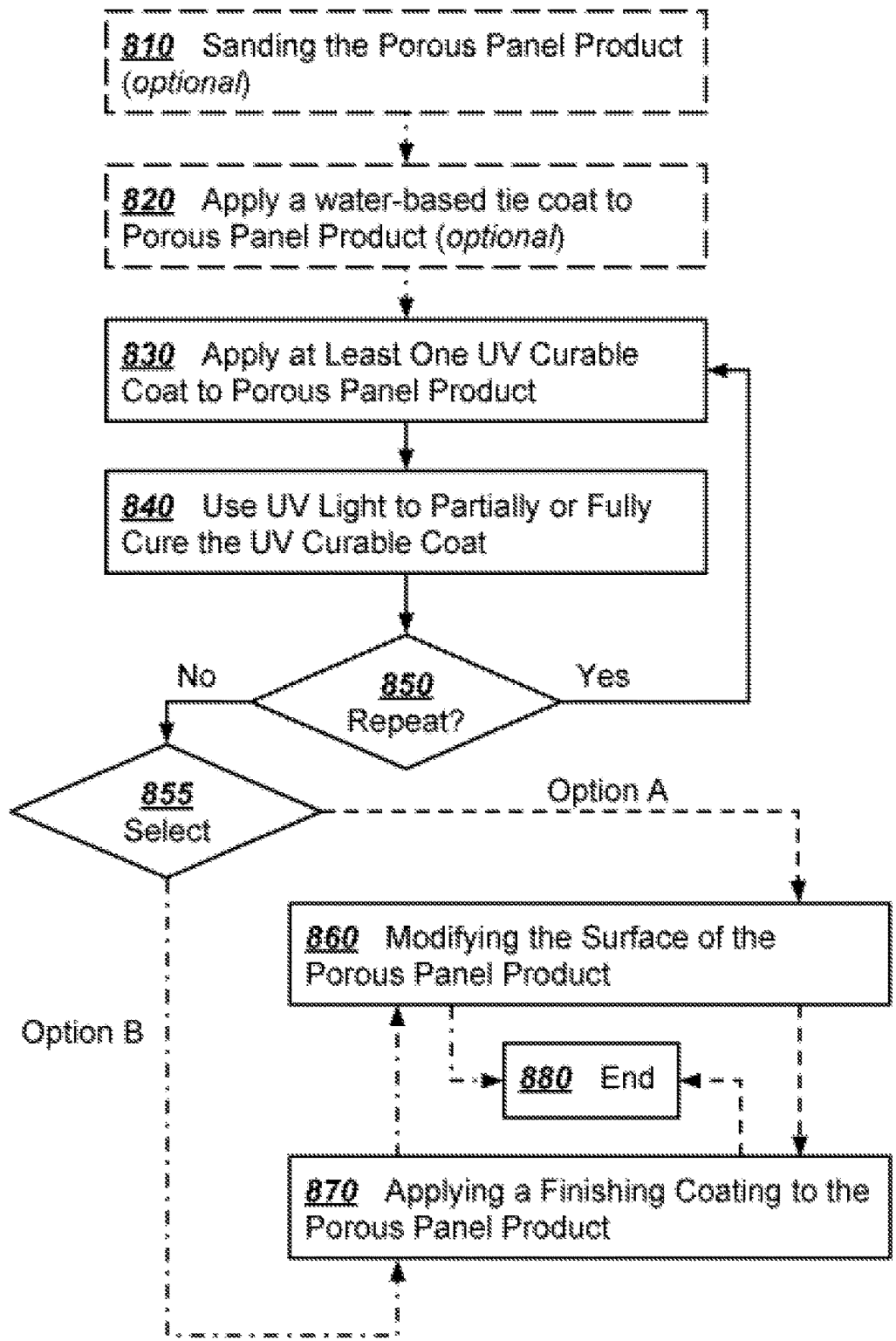
FIG. 8 depicts an example process of sealing and finishing a porous panel product. Optional steps of the process are shown in boxes with dashed lines.

FIG. 7A depicts an exemplary embodiment corresponding to the three coat process of both particle and MDF/HDF boards of porous panel product 105 as described in FIG. 9. FIG. 7B depicts an exemplary embodiment corresponding to the two coat process of particle boards of porous panel product 105 as described in FIG. 10. FIG. 7C depicts an exemplary embodiment corresponding to the one coat process of MDF/HDF boards of porous panel product 105 as described in FIG. 10. The thickness of the UV curable coating 115 (including at least one of first 110, second 120, and third 130 UV curable coatings) may be applied such that the at least one UV curable coating 115 is applied with a weight of one or more of the following application weights: 45-150 g/m$^2$, 45-120 g/m$^2$, 45-90 g/m$^2$, 28-120 g/m$^2$, 28-100 g/m$^2$, or 28-80 g/m$^2$ (see FIGS. 9-11). The various embodiments of FIGS. 7A-7C and 8 can be applied to one, two, or three coat processes according to any of the targeted parameters described in FIGS. 9-11.

In some embodiments, the targeted endpoint of the curing process is measured in curing energy (e.g., millijoules per square centimeter (mj/cm$^2$)) instead of by a percentage or amount of curing. Just one of many embodiments comprises applying to a porous panel product 105 at least one UV curable coating 115; curing by UV light the at least one UV curable coating 110 with a curing energy of 290-525 mj/cm$^2$; applying to a porous panel product a second UV curable coating 120; curing by UV light the second UV curable coating 120 with a curing energy of 290-525 mj/cm$^2$; applying to a porous panel product a third UV curable coating 130; and curing by UV light the third UV curable coating 130 with a curing energy of 495-583 mj/cm$^2$ to produce a sealed porous panel product. The first, second, and third UV curable coatings (110, 120, and 130) may comprise one, two, three, or more different UV curable coatings 115.

Certain embodiments may comprise applying to a porous panel product 105 at least one UV curable coating 115; curing by UV light the at least one UV curable coating 115 with a curing energy of 290-495 mj/cm$^2$; applying to a porous panel product a second UV curable coating 120; and curing by UV light the second UV curable coating 120 with a curing energy of 495-525 mj/cm$^2$ to produce a sealed porous panel product. Another embodiment may comprise applying to a porous panel product 105 a single UV curable coating 110; and curing by UV light the UV curable coating 110 with a curing energy of 435-583 mj/cm$^2$ to produce a sealed porous panel product. Numerous additional embodiments of targeted curing energies and/or curing amounts together with application weights of the UV curable coating 115 are further disclosed in FIGS. 9-11.

In some embodiments, the top layer 150 of UV curable coating 115 has a preferred curing amount of 75-95% cured. Some embodiments of the disclosed methods result in a preferred curing amount of 80-90% cured. Certain embodiments of the disclosed methods result in a preferred curing amount of 83-87% cured. Some embodiments of the disclosed methods result in a preferred curing amount of approximately 85% cured.

In some aspects of practicing the disclosed methods, the porous panel product 105 may require sanding 810 prior to application of the UV curable coating 115 to the porous panel product 105. The porous panel product 105 may be sanded 810 with sandpaper or with a sanding disk. The grit of the sanding apparatus depends on the quality and condition of the wood fibers of the porous panel product 105, for example, 180 grit, 220 grit, or 320 grit. Sanding 810 prior to application of the UV curable coating is recommended if the surface of the porous panel product 105 is not sufficiently clean for adhesion of applied coatings.

Adhesion of the UV curable coating 115 to the porous panel product 105 may also be increased by the application of water-based tie coat 820. Thus in some embodiments, the methods may further comprise applying a water-based tie coat 820 to the porous panel product 105. Thus the application step would take place just before the application of the first layer of the UV curable coating 110. The application of the water-based tie coat 820 is recommended if the porous panel product 105 was poorly pressed.

Prior to finishing the sealed porous panel product 105 with paint or other finish products 190, the methods may further comprise modifying 860 the surface of the sealed porous panel product 105, resulting in a varied surface 175. In some embodiments, the modification 860 enables the surface of the sealed porous panel product 105 to be stained. The modification 860 may merely be sanding the surface of the sealed porous panel product 105 to smooth the sealed surface for finishing, for example, by using 220 grit, 320 grit, or 400 grit sandpaper or sand disk. Modifying 860 the surface of the sealed porous panel product may also introduce varied surface 175 as decorative patterns for the porous panel product, for example a finished appearance that mimics wood grains 180, like the hardwood veneer (see FIGS. 1, 5, and 6). The wood grains 180 appearance may be etched or embossed onto the surface of the sealed porous panel product 105. The sealed porous panel product 105 may be etched by laser or by chemicals. The wood grains 180 appearance may also be made on the surface of the sealed porous panel 105 by sandblasting.

In one embodiment, the surface of the sealed porous panel product 105 may be etched with 24 grit to 80 grit sandpaper or sanding belt to produce the decorative pattern (e.g., wood grains 180) that mimics the grains of mahogany wood. In a preferred embodiment for generating the appearance wood grains 180, the sandpaper or sanding belt used for mimicking actual wood grains is between 60 grit to 80 grit. The pressure of the sanding affects the final wood grain 180 appearance. Sanding deeper into the sealed porous panel product 105 will result in a dark appearance. On the other hand, sanding lighter into the sealed porous panel product 105 will produce lighter appearance and also lighter definition of the mimicked wood grains 180.

In other embodiments, an embosser may be used to modify the surface of the sealed porous panel product 105 to give the appearance of wood grains 180 that has patterned grains, such as oak. In some embodiments, a laser may be used to etch the surface of sealed porous panel product 105 to give either the unpatterned wood grain 180 pattern like that of mahogany or patterned wood grain 180 pattern like that of oak. In some implementations, an actual image of a wood pattern (for example cherry wood or oak wood) may be the basis for embossing pattern. Thus the embossing cylinder of the embosser may be laser or router etched with the actual image of the wood pattern in order to reproduce the actual image onto the surface of the sealed porous panel product 105 as wood grain 180. In implementations where the modification of the surface of the sealed porous panel product 105 comprises embossing, sanding the surface of the sealed porous panel product 105, for example, by using 220 grit, 320 grit, or 400 grit sandpaper or sand disk may take place before or after the embossing.

Unlike porous panel products 105 that are not treated with the disclosed sealing process, the sealed porous panel product 105 may be stained with any wood strain. Thus either water-based or solvent-based stain may be used on the sealed porous panel product 105. Accordingly, oil stains, varnish stains, water-based stains, gel stains, lacquer stains, water-soluble dye stain, or metal-complex (metalized) dye stains may be used to stain the sealed porous panel product. The porous panel product 105 may be further finished 870 by the application of a varnish or surface film that seals the stain. In some embodiments, the varnish or surface film is a coating. In some embodiments, the varnish or surface film is a finish coating 190.

The present disclosure is further illustrated by the following examples that should not be construed as limiting. The contents of all references, patents, and published patent applications cited throughout this application, as well as the Figures, are incorporated herein by reference in their entirety for all purposes.

Examples

Example 1. Comparison of Finished Products Treated or Untreated with the Disclosed Sealing Process Porous panel products 105 were finished with one coat of a pigmented conversion varnish was spray applied at 3 wet mils without any sealing treatment or over a sealed surface. The sealed surface was produced by with application of three UV curable coatings 115 applied via roll coaters. The first layer of a UV curable coating 110 was partially cured at 65% before the application of a second UV curable coating 120. The second layer of UV curable coating 120 was partially cured at 60% before the application of a third UV curable coating 130, which was partially cured at 80%. The coated surface was then sanded 860 with 320 grit sandpaper using a sanding machine.

The finished porous panel product 105 treated with sealing process of the disclosure has better color uniformity compared the finished porous panel product 105 that did not receive the treatment. The whiteness and sheen is more evenly distributed on the porous panel product 105 treated with the sealing process of the disclosure. The sealing treatment also provided a smoother finished surface. The finished porous panel product 105 treated with the sealing process of the disclosure also has greater chemical and water resistance properties than the product that did not receive the treatment.

Example 2. Comparison of Finished Products Treated with Just a Primer and Treated with a Primer and the Disclosed Sealing Process For a porous panel product 105 that was treated using just a primer, two coats of a pigmented primer were spray applied at 3 wet mils per application to the untreated surface, then sanded with 400 grit sandpaper. The surface was finished with one coat of a pigmented conversion varnish spray applied at 3 wet mils. For the porous panel product 105 that was treated with the sealing process of the disclosure, the sealed surface was produced by application of three UV curable coatings 115 (e.g., 110, 120 and 130) applied via roll coaters. The first layer of a UV curable coating 110 was partially cured at 65% before the application of a second UV curable coating 120. The second layer of UV curable coating 120 was partially cured at 60% before the application of a third UV curable coating 130, which was partially cured at 80%. One coat of a pigmented primer was spray applied at 3 wet mils to the sealed surface, then sanded 860 with 400 grit sandpaper. Lastly, one coat of a pigmented conversion varnish was spray applied 870 at 3 wet mils to the sealed surface to achieve the final finish coat 190.

A comparison between sealed and unsealed porous panel products demonstrates that the use of multiple layers of spray-applied primer does not provide the same finish properties as the sealed porous panel product 105 processed according to the disclosed methods. The sealed porous panel product 105 processed according to the disclosed methods has increased opacity, durability, a smoother appearance and feel, and used 50% less spray applied primer.

Example 3. Comparison of Finished MDF Treated with to the Methods of the Prior Art and Treated with the Sealing Process of the Disclosure Methods for sealing MDFs in the prior art involve the application of primers, which is apparent as an additional layer on the fiberboard. However, the disclosed process of sealing porous panel products 105 uses a UV curable coating 115 that does not add to the additional bulk while still smoothing the surface for the application of a finishing coating. However, in spite of primers essentially provide an additional layer to the MDF that should provide a smoother surface for the finishing coating, the sealed surface produced by methods of the disclosure provides a smoother surface for the finishing coating. This is made apparent by comparing the reflection of light on the finished MDF treated with to the methods of the prior art and on the finished MDF treated with the sealing process of the disclosure. The reflection on the finished surface from an MDF treated with the sealing process of the disclosure provides nearly a mirror-like reflection. On the other hand, the finished MDF that was primed (rather than sealed by the process of the disclosure) has a rough surface that shows a heavily distorted reflection. Accordingly, sealing the porous panel product according to the methods of the disclosure improves the flow, leveling, sheen uniformity, and smoothness of the finishing coating.

Example 4. The Finished Porous Panel Product Treated with the Sealing Process of the Disclosure is Modified and Stained to Look Like Mahogany The finished porous panel product 105 treated with the sealing process of the disclosure may be further finished with a staining treatment. The surface of a finished MDF was etched 860 using sandpaper to introduce the appearance of mahogany grains prior to the application of the stain. The grains were introduced onto the surface of the sealed MDF using sandpaper between 60 grit to 80 grit. Because the MDF was treated with the disclosed sealing process prior to the application of the stain, the stain was able to absorb into the porous panel product 105 completely and can show grain definition. The sealing process of the disclosure allows the porous panel product 105 to have both a "hard" and "soft" surface that is very similar to a true hardwood like mahogany. These differences in hard and soft allow the stain product to penetrate at different rates thus giving a "natural" appearance.

What is claimed is:

1. A method of preparing a porous panel product for painting or staining, comprising:
applying to the porous panel product a top UV curable coating;
partially curing the top UV curable coating to 50% to 75% cure, or 75% to 95% cure with UV light at 290-583 mJ/cm$^2$ of curing energy; and
sanding the partially cured top coat to produce a modified partially cured porous panel product in preparation for painting or staining.

2. The method of claim 1, wherein the top UV curable coating is applied with an application weight selected from the group consisting of: 45-150 g/m$^2$, 45-120 g/m$^2$, 45-90 g/m$^2$, 28-120 g/m$^2$, 28-100 g/m$^2$, and 28-80 g/m$^2$, and wherein the top UV curable coating is 75% to 95% cured and wherein the top UV curable coating comprises at least one filler selected from the group consisting of: $CaCO_3$, silica, talc, and silicone.

3. The method of claim 1, wherein the top UV curable coating comprises at least 99% solids.

4. The method of claim 1, further comprising one or two more UV curable coatings, and the top UV curable coating is 75% to 95% cured.

5. The method of claim 1, wherein the UV curing energy of the top coat is 435-525 $mJ/cm^2$, and the top coat is 75% to 90% cured.

6. A method of preparing a porous panel product for painting or staining, comprising:
   applying to the porous panel product a first UV curable coating;
   curing by UV light the first UV curable coating with 290-525 $mJ/cm^2$ of curing energy to produce a coated porous panel product;
   applying a top UV curable coating to the coated porous panel product;
   partially curing the top UV curable coating to 50% to 75% cure or 75% to 95% cure with UV light to produce the partially cured porous panel product; and
   sanding the partially cured top coat to produce a modified partially cured porous panel product in preparation for painting or staining.

7. The method of claim 6, wherein:
   the first UV curable coating is 50% to 90% cure; and
   the top UV curable coating to 75% to 90% cure.

8. The method of claim 6, wherein the top UV curable coating is 75% to 95% cured.

9. The method of claim 8, wherein the top UV curable coating is 80% to 90% cured.

10. The method of claim 8, wherein the top UV curable coating is 75%-85% cured.

11. The method of claim 6, wherein the sandpaper or sanding disk has a grit selected from the group consisting of: 220 grit, 320 grit, and 400 grit.

12. The method of claim 6, wherein the top UV curable coating is 50% to 75% cured.

13. A method of producing a painted or stained porous panel product, comprising:
   applying to a porous panel product a top UV curable coating;
   partially curing the top UV curable coating to 50% to 75% cure or 75% to 95% cure with UV light at 290-583 $mJ/cm^2$ of curing energy to produce partially cured porous panel product;
   modifying the surface of the partially cured porous panel product by sanding to smooth the partially cured panel product surface; and
   applying a finishing coating of paint or stain to the modified partially cured porous panel surface.

14. The method of claim 13, wherein the top UV curable coating is 75% to 95% cured.

15. The method of claim 13, wherein the top UV curable coating is 80% to 90% cured.

16. The method of claim 13, wherein the top UV curable coating is 75% to 85% cured.

17. The method of claim 13, wherein the step of sanding is done with sandpaper or sanding belt and the sandpaper or sanding disk has a grit selected from the group consisting of: 220 grit, 320 grit, and 400 grit.

18. The method of claim 13, wherein the top UV curable coating is 50% to 75% cured.

19. The method of claim 6, further comprising the step of applying to the partially cured porous panel product a finishing coating of paint or stain.

20. The method of claim 6, wherein the top UV curable coating comprises at least one monomer additive selected from the group consisting of: DPGDA, HDODA, TRPDGA, TMPTA, TMPTMA, TPGDA, HDDA, and PETA; and at least one filler selected from the group consisting of: $CaCO_3$, silica, talc, and silicone.

* * * * *